United States Patent [19]

Taylor

[11] 4,317,470
[45] Mar. 2, 1982

[54] RUPTURE BAND RELIEF VALVE

[76] Inventor: Julian S. Taylor, 8300 SW. 8, Oklahoma City, Okla. 73108

[21] Appl. No.: 159,263

[22] Filed: Jun. 13, 1980

[51] Int. Cl.³ .............................................. F16K 13/04
[52] U.S. Cl. ...................................... 137/70; 137/71; 220/89 A
[58] Field of Search ................... 137/68 R, 69, 70, 71, 137/68 A; 220/89 A

[56] References Cited

U.S. PATENT DOCUMENTS 2,115,371  4/1938  Mossberg ........................ 137/69 X
2,141,847  12/1938  Tennant ................................ 137/70
4,082,104  4/1978  Keeney ................................. 137/71

Primary Examiner—Harold W. Weakley
Attorney, Agent, or Firm—Robert K. Rhea

[57] ABSTRACT

A valve body, having a lateral exhaust port, is provided with a valve movable toward and away from a fluid inlet sealing face at its pressure connected end and guided by a valve stem projecting through the other end of the body. A plurality of rupture bands, extending transversely across the outwardly projecting end of the valve stem, are connected with the body for normally maintaining the valve closed. Excessive fluid pressure against the valve ruptures the bands and releases pressure through the lateral port.

11 Claims, 6 Drawing Figures

RUPTURE BAND RELIEF VALVE

BACKGROUND OF THE INVENTION

1. Field of the Invention

The present invention relates to fluid pressure relief valves.

Relief valves are conventionally used in fluid pressure systems for the purpose of protecting the fluid pressure generating equipment, such as a cylinder, cylinder heads, bolts, pump valves, packing or cups, so that, in the event of malfunction or closing an external valve in error or excessive pressure as caused by a clogged drilling bit, the relief valve is biased to an open fluid discharge position enabling the operators to correct the malfunction without damage to the equipment. It is desirable to have a fluid pressure relief valve which may be calibrated in the field in accordance with the maximum fluid pressure to be generated. This invention provides such a relief valve.

2. Description of the Prior Art

Fluid pressure relief valves presently in use and as disclosed by prior patents generally relate to valve structure which includes a valve stem or mandrel moved longitudinally in response to predetermined fluid pressure which shears a pin or ruptures a frangible disk, or the like. The pressure setting in which these valves open to release such pressure is predetermined by the pressure necessary to shear the shear pin or rupture the frangible disk. The pressure at which such a valve opens is thus predetermined by the known rating or shearing force required to shear a pin or rupture a frangible disk of predetermined thickness.

Shear type valves are dangerous in that they can be rendered inoperative by a workman, tired of resetting the valve, putting more than one shear pin or nail through the shear bar on one type safety relief valve or using extra strong metal, such as an Allen wrench through the shear stem in another type shear relief valve. Rupture disks have the disadvantage of being difficult to service in the field and each disk has only one rupture value.

This invention overcomes this disadvantage by providing a pressure relief valve permitting a reduction in the pressure required to open the valve in accordance with a desired maximum pressure in a fluid system.

SUMMARY OF THE INVENTION

A valve body or housing, having an exhaust port normal to the axis of its inlet passage, is provided with a valve normally closing the inlet passage. The valve is provided with a valve stem axially aligned with its inlet passage which projects beyond the housing opposite the inlet passage. The outwardly projecting end portion of the valve stem is transversely enlarged. A plurality of rupture bands extend transversely across the enlarged end of the valve stem in parallel spaced relation and are secured at their respective ends within slots formed in the adjacent end portion of the valve housing on diametrically opposite sides of the stem. A desired pressure relief rating for the valve less than the known value detemined by the combined tensile strength of the plurality of rupture bands is achieved by cutting one or more of the bands at the time of installation. A bull plug-like safety cap is coaxially secured to the valve housing and surrounds the rupture bands and outwardly projecting end portion of the valve stem.

The principal object of this invention is to provide a fluid pressure safety relief valve for protection of fluid pumps or lines in which selected ones of a plurality of rupture bands, extending transversely across the outwardly projecting end of an excess pressure moved valve stem, may be cut in the field to provide a relief valve having a lower pressure value.

DESCRIPTION OF THE PREFERRED EMBODIMENT

Figure 1:
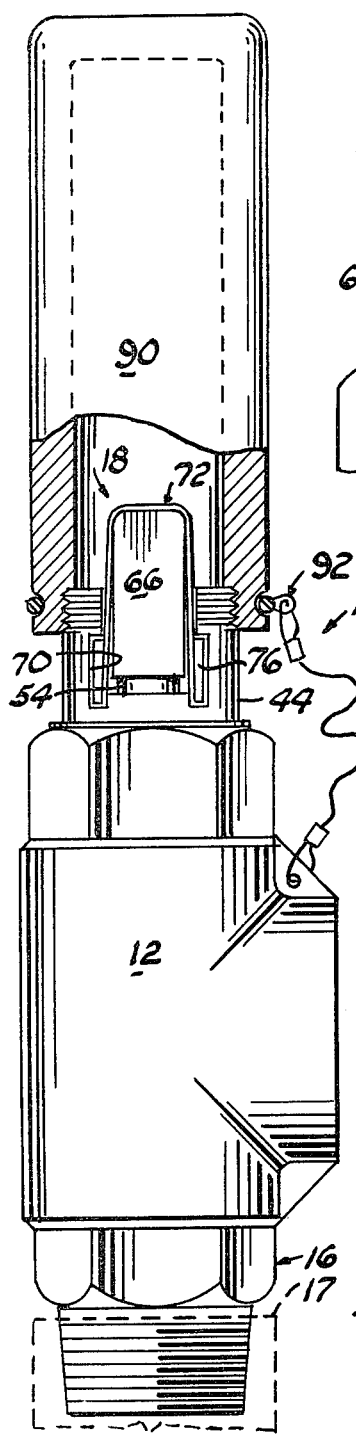
FIG. 1 is a side elevational view of the valve with a portion of the safety cap in section for clarity.
Figure 3:
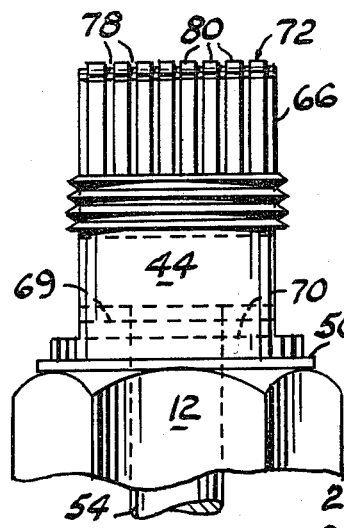
FIG. 3 is a fragmentary elevational view of the top part of the valve, with the safety cap removed, when rotated at 90° about its longitudinal axis from the position of FIG. 2.
Figure 4:
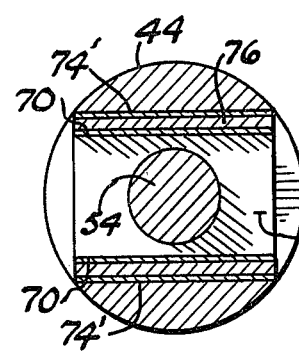
FIG. 4 is a horizontal sectional view taken substantially along the line 4—4 of FIG. 2.

Like characters of reference designate like parts in those figures of the drawings in which they occur.

In the drawings:

The reference numeral 10 indicates the valve which is generally cylindrical. The valve 10 comprises a hollow body 12 having an internally threaded lateral exhaust port 14 intermediate its ends. The body 12 is provided, at one end, with inlet means 16 adapted to be connected with a line 17 containing fluid under pressure. The other end of the body supports rupture band means 18 adapted to be ruptured by excess fluid pressure in its inlet end 16 for releasing such fluid pressure through the lateral port 14. The term "rupture" as used herein indicates a longitudinal stretching exceeding the tensile strength of the band means as opposed to a shearing action of frangible material. The valve body 12 is longitudinally centrally bored and counterbored, as at 20 and 22, defining an annular shoulder 24 in its end portion opposite its inlet end for the purposes presently explained.

The inlet means 16 comprises a sleeve 26 having external threads 28 and 30 at its respective ends, threadedly received by the body counterbore 22 and the pressure line 17, respectively. The sleeve bore 31 forms a fluid inlet passage. Obviously, the sleeve 26 may be internally threaded for receiving the pressure line 17, if desired. The inwardly disposed end of the sleeve 26 is counter-bored and threaded, as at 32, for receiving a bushing 34.

The bore 36 of the bushing 34 forms a sealing face for the purposes presently explained. The bore 36 tapers outwardly, as at 38, to form a tapered surface facing the rupture band means 18. O-rings, or the like, 40 and 42 seal the sleeve threads 28 and 32 with the valve body and bushing, respectively.

A cylindrical plug 44 is coaxially received by the valve body bore 20 and projects beyond the end of the valve body opposite the inlet means 16. The inward end of the plug 44 is provided with an outstanding annular flange 46 closely received by the body counterbore 22 and defines an annular shoulder 48 abutting the valve body shoulder 24 to prevent axial movement of the plug 44 out of the body. A snap ring 50, disposed in a suitable groove formed in the periphery of the plug 44, abuts the end of the valve body opposite its inlet end to prevent axial movement of the plug 44 into the valve body. The plug 44 is coaxially bored, as at 52, for slidably receiving the stem 54 of valve means 56.

The valve means 56 comprises a piston-like valve 58 formed on the end portion of the stem 54 opposite the rupture band means 18 and closely received slidably by the sealing face 36 and is normally disposed intermediate the ends of the bushing 34. Packing 60 surrounds the valve stem 54 adjacent the surface of the valve 50 facing the inlet end of the sleeve 26 and is held in place by a washer 62 and clip 64 secured to the valve stem. Fluid pressure in the sleeve bore 31 seals the packing 60 with the sealing face 36.

The other end of the valve stem 54 is connected with a generally rectangular valve stem lug 66 which projects beyond the outwardly disposed end of the plug 44 a selected distance through a diametric slot 68 intersecting the bore 52. The inner limit of the slot 68 is defined by a flat surface 69. Inwardly of the axial outer end surface of the plug the slot 68 is laterally widened to form opposing parallel diametrically opposite rectangular recesses 70 intersecting the plug surface 69 and spaced outwardly of the cylindrical plane of the plug bore 52 for receiving a rupture band element 72.

Figure 6:
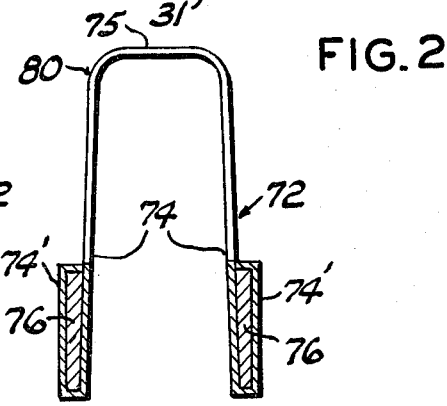
FIG. 6 is a vertical cross sectional view taken substantially along the line 6—6 of FIG. 5.

The rupture band element 72 is formed from a section of sheet metal and is substantially inverted U-shape in end elevation (FIG. 6) having leg members 74 joined by a bight portion 75. Each of the leg members 74 are doubled back upon themselves to form closed loops 74', cooperatively received by the rectangular slots 70. The loops 74' are filled by a pair of lugs 76 for the purposes presently explained.

The major portion of the legs 74 and bight portion 75 of the element 72 are longitudinally slotted, as at 78, to define a plurality of equal width equally spaced-apart bands 80 extending transversely across the outwardly protruding portion of the valve stem lug 66, for the purposes presently explained.

The inwardly disposed end of the plug 44 is counterbored, as at 82, diametrically equal with the bushing bore 36 and similarly provided with a tapered surface 84 facing the bushing 34 to form a socket for receiving the valve 58 when the bands 80 rupture. Other O-rings seals 86 and 88 seal the valve stem 54 with the bore 52 and the plug 44 with the valve body bore 20. Obviously, the plug 44 may be formed integral with the body 12.

The outwardly disposed end of the plug 44 is externally threaded for receiving a bull plug-like safety cap 90 which is secured to the valve body by swivel thong means 92 to prevent the misplacing of safety cap 90 and for safety from the rapidly moving head 66 once bands 80 rupture.

Operation

Figure 2:
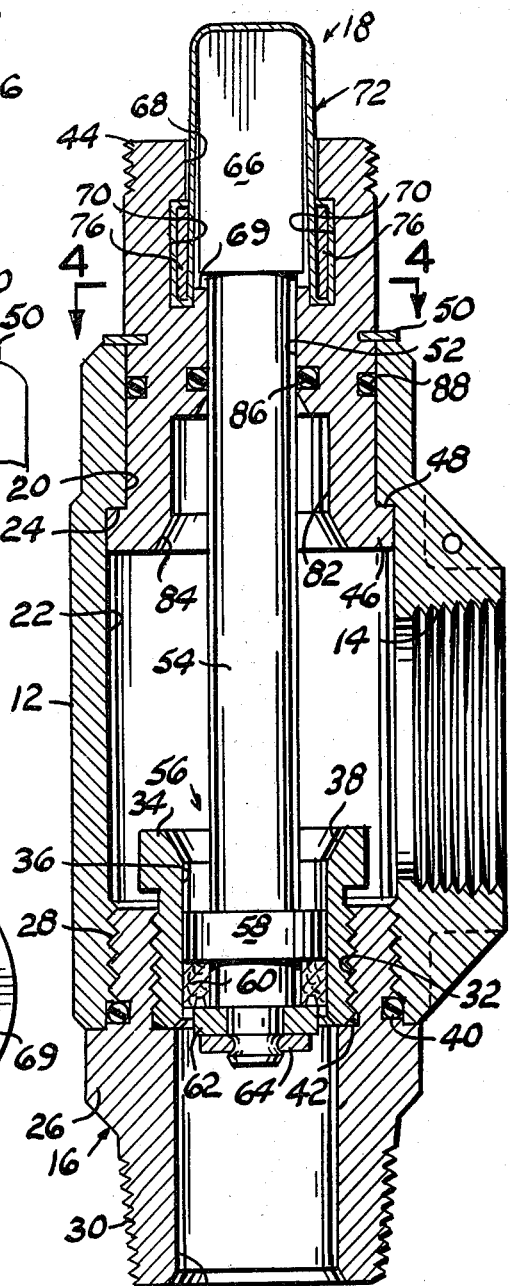
FIG. 2 is a vertical cross sectional view, to a larger scale, with the safety cap removed.
Figure 5:
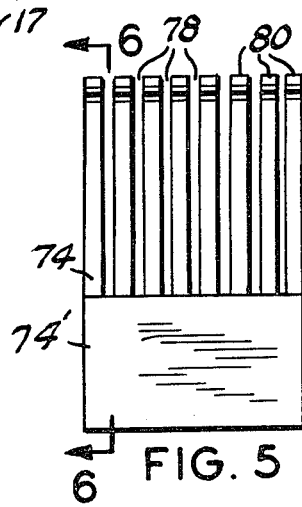
FIG. 5 is a side elevational view of the rupture band element, per se.

In operation, the rupture means 72 is formed from sheet material having a known yield value and thus the combined total yield value of the several bands 80, eight in the example shown, equal the maximum pressure setting of the valve 10. The rupture means 72 maintains the valve means in closed position with pressure against the valve 58 from the pressure line 17. As shown in FIG. 2, the corner edges of the stem lug 66 underlying the rupture bands 80 is rounded to prevent a shearing action on the bands. The lugs 76 prevent a collapsing action of the loops 74' by pressure against the bands 80.

In the event the pressure exceeds the predetermined value, the rupture bands 80 rupture by the pressure against the valve 58 which moves the valve toward the plug 44 thus opening the valve to exhaust the fluid through the exhaust port 14. The valve can be reset, after shutting off pressure in the line 17, without removal from the line 17 by removing the safety cap 90 and manually moving the valve stem axially and valve 58 into the bushing 34 until the stem lug 66 contacts the plug surface 69. After manually sliding the ruptured band means 72 out of the slots 68 and 70, a new rupture band means is inserted into the slots 70 and over the valve stem lug 66.

An important feature of the valve is that when a lower maximum pressure is desired, before the valve releases such pressure, a selected one or more of the rupture bands 80 may be cut prior to or after installation so that the remaining uncut bands 80 equal the desired maximum pressure.

Obviously the invention is susceptible to changes or alterations without defeating its practicability. Therefore, I do not wish to be confined to the preferred embodiment shown in the drawings and described herein.

I claim:

1. A relief valve, comprising:

a housing;

means at one end of the housing forming an inlet passage;

valve means sealing with and normally closing the inlet passage,
    said valve means including a stem slidably projecting through the housing opposite the inlet passage; and, generally U-shape band means extending transversely across the outwardly projecting end portion of said stem and supported by said housing for maintaining said valve means in inlet passage closed position,
    said stem acting to extend said band means beyond its tensile strength limit in response to predetermined pressure against said valve means releasing the seal between said valve means and the inlet passage.

2. The relief valve according to claim 1 in which said housing is slotted on diametric opposite sides of said stem normal to the longitudinal axis of said stem and said band means comprises:

a length of sheet material having its respective end portions secured within the respective slots.

3. The relief valve according to claim 2 in which the respective end portions of said sheet material are doubled back upon themselves and slidably received within the respective slots.

4. The relief valve according to claim 3 in which said length of sheet material is longitudinally slotted intermediate its ends to form a plurality of spaced-apart bands.

5. The relief valve according to claim 3 or 4 in which said inlet passage means comprises:

a sleeve secured at one end within said housing; and, a bushing secured within the inwardly disposed end portion of said sleeve for forming a sealing face surrounding said valve means.

6. The relief valve according to claim 5 in which said valve means further includes:

a piston surrounding said stem; and, sealing means secured to said stem adjacent the face of said piston opposite the outwardly projecting end of said stem for sealing with said sealing face.

7. The relief valve according to claim 4 in which the outwardly projecting end portion of said stem is transversely enlarged a distance at least equal to the transverse distance across said plurality of bands.

8. A relief valve comprising:
a housing;
means at one end of the housing forming an inlet passage;
valve means sealing with and normally closing the inlet passage,
said valve means including a stem;
a plug closing the end of said housing opposite the inlet passage,
said plug having a bore surrounding said stem intermediate its ends; and,
generally U-shape band means extending transversely across the end portion of said stem opposite the inlet passage and supported by said plug for maintaining said valve means in inlet passage closed position,
said stem acting to extend said band means beyond its tensile strength limit in response to predetermined pressure against said valve means releasing the seal between said valve means and the inlet passage.

9. The relief valve according to claim 8 in which said plug is characterized by a diametric slot extending inwardly from its end opposite the inlet passage and terminating in a pair of parallel transverse diametrically opposite recesses and further including:
a lug substantially coextensive with the slot secured to said stem and projecting beyond the end of said plug opposite the inlet passage.

10. The relief valve according to claim 9 in which said band means comprises:
a length of sheet material having its respective end portions doubled back upon themselves to form loops nested by the pair of recesses.

11. The relief valve according to claim 10 in which said length of sheet material is longitudinally slotted intermediate its ends to form a plurality of spaced-apart bands.

* * * * *